United States Patent
Qiu et al.

(10) Patent No.: US 12,529,602 B2
(45) Date of Patent: Jan. 20, 2026

(54) COLOR MATCHING OBSERVATION BOX FOR LED STANDARD LIGHT SOURCE

(71) Applicant: Wenzhou Jiayi Instruments Co., Ltd, Zhejiang (CN)

(72) Inventors: Binhui Qiu, Zhejiang (CN); Zhiyong Gao, Zhejiang (CN); Guolin Lei, Zhejiang (CN); Daping Deng, Zhejiang (CN); Yubao Li, Zhejiang (CN); Jiayi Qiu, Zhejiang (CN)

(73) Assignee: Wenzhou Jiayi Instruments Co., Ltd, Zhejiang (CN)

( * ) Notice: Subject to any disclaimer, the term of this patent is extended or adjusted under 35 U.S.C. 154(b) by 224 days.

(21) Appl. No.: 18/474,245

(22) Filed: Sep. 26, 2023

(65) Prior Publication Data

US 2025/0076119 A1 Mar. 6, 2025

(30) Foreign Application Priority Data

Sep. 6, 2023 (CN) .......................... 202311149508.3

(51) Int. Cl.
*G01J 3/46* (2006.01)
*G01J 3/02* (2006.01)
*G01J 3/50* (2006.01)

(52) U.S. Cl.
CPC .............. *G01J 3/463* (2013.01); *G01J 3/0229* (2013.01); *G01J 3/0291* (2013.01); *G01J 3/501* (2013.01)

(58) Field of Classification Search
CPC ........ G01J 3/463; G01J 3/0229; G01J 3/0291; G01J 3/501

USPC ......................................................... 362/209
See application file for complete search history.

(56) References Cited

U.S. PATENT DOCUMENTS

| | | | | |
|---|---|---|---|---|
| 3,597,094 A | * | 8/1971 | Goldwasser ............ | G01J 3/463 356/419 |
| 4,812,904 A | * | 3/1989 | Maring ..................... | G01J 3/50 382/165 |
| 10,215,640 B2 | * | 2/2019 | Qiu ........................... | G01J 3/51 |
| 2018/0120161 A1 | | 5/2018 | Qiu et al. | |

FOREIGN PATENT DOCUMENTS

| | | | | |
|---|---|---|---|---|
| CN | 105588639 | | 3/2018 | |
| GB | 2452716 A | * | 3/2009 | ............... G01J 3/10 |
| GB | 2630290 A | * | 11/2024 | ............. H05B 45/20 |

* cited by examiner

Primary Examiner — Laura K Tso
(74) Attorney, Agent, or Firm — JCIPRNET

(57) ABSTRACT

A color matching observation box for an LED standard light source comprises a box body, wherein an opening is formed in one side of the box body, an observation chamber is formed by the internal space of the box body, and a standard light source is disposed at the top of the observation chamber and comprises multiple lamp beads; and each of the lamp beads comprises a purple LED chip with a wavelength of 410 nm-430 nm, a blue LED chip with a wavelength of 440 nm-460 nm, and hybrid fluorescent powder. The color matching observation box may be provided with two groups of fluorescent lamps and one group of UV lamps, wherein the UV lamps can be used separately or in combination with other light sources.

9 Claims, 5 Drawing Sheets

COLOR MATCHING OBSERVATION BOX FOR LED STANDARD LIGHT SOURCE

CROSS-REFERENCE TO RELATED APPLICATION

This application claims the priority benefit of China application serial no. 202311149508.3, filed on Sep. 6, 2023. The entirety of the above-mentioned patent application is hereby incorporated by reference herein and made a part of this specification.

BACKGROUND

Technical Field

The disclosure relates to a detection structure, in particular to a color matching observation box for an LED standard light source.

Description of Related Art

In the current market, a variety of brands of fluorescent tubes are used as a daylight source of a standard D illuminant of a color matching observation box or light box for standard light sources, or light emitted by halogen tungsten lamps is made to pass through a light filter to simulate the D illuminant specified by the CIE standard. The relative spectral power distribution of the light source obtained by making light emitted by the halogen tungsten lamps to pass through the light filter can reach Level A of the metamerism index of the D illuminant specified by the CIE standard. However, due to the influence of the material and the manufacturing process, it is difficult for the technical indicator of the relative spectral power distribution of the light source to reach Level A of the metamerism index, which is less than 0.25, of the D illuminant specified by the CIE standard. During long-term use, it will deteriorate gradually, and even exceed the metamerism index of 0.25, reaching Level B or Level C only. As the halogen tungsten lamps of the same specification have a difference in material composition, the relative spectral power distributions of light rays emitted therefrom cannot have a relatively consistent quality. The light filter made of colored optical glass will change the relative spectral power distribution of the light. The combination of the light filter and the halogen tungsten lamp can only form CIE standard-specified D illuminants of a single specification. CIE standard-specified illuminants are of many standard specifications such as D65, D75, D55 and D50. In the prior art, it is difficult to ensure that the standard light source still has a stable spectral power distribution after long-term use, and the replacement of the halogen tungsten lamp or the light filter will produce a difference, thus affecting test accuracy.

It is difficult to overcome the zigzag shape in different wavebands of the spectral power distribution of the light, passing through the light filter, from the halogen tungsten lamp, so the light source quality of a light box which is considered to have the highest quality in the current market can only reach Level A or B (0.20-0.30) of the metamerism index of light sources specified by CIE15:2004. Due to a gradual change in efficiency of tungsten wires and inert gas containing halide and halogen elements in halogen tungsten lamp tubes adopted by such standard D daylight sources during long-term use of the lamp tubes and a variation of the material (chemical material) of the colored optical glass of the light filter, the relative spectral power distribution of the light source will be changed, and during the usage, the metamerism index of an A-level light source will gradually increase to 0.25 to 0.30, only maintaining a B-level level.

Because LED light sources have the advantages of power saving, high luminous efficiency and long service life, a number of light source research units have introduced the use of LEDs to simulate CIE standard D light sources. One technical solution is to combine multiple narrow-waveband LEDs to simulate a D light source. Since the spectral distribution of light rays emitted by the LEDs can only be in the narrow waveband and the main peak of the spectrum emitted by each LED is narrowed into a spike, the spectral power distribution of light emitted by the multiple narrow-waveband LEDs is close to the specification of D illuminants specified by the CIE standard, but the energy of the main peak of the spectrum emitted by the LEDs is significant, and the spectral curve is not smooth enough. Another technical solution is to use full-spectrum LEDs to simulate the D light source, but it is not impossible at present to simulate, with only one type of LEDs, a D light source with the CIE standard metamerism index reaching Level A specified by the CIE standard.

Granted Patent No. CN105588639B provides a standard light source color matching observation box. In this application, light from a halogen tungsten lamp passes through a light filter to form non-compensated radiation light; a narrow-wave LED light source is used to emit compensation light; and the non-compensated radiation light and the compensation light are mixed in the color matching observation box to form compensated radiation light, which is used to test the color of a tested object in the color matching observation box. The light emitted by the halogen tungsten lamp is used as the main radiation light, so the spectral power distribution curve has fewer spikes; and the lack of energy of the light, passing through the light filter, from halogen tungsten lamp is compensated for by the low-power narrow-wave LED light source, such that high-precision D illuminator conforming to the CIE standard can be simulated.

Due to the increasingly higher requirements for equipment in the market, the daylight D65 light source of the observation box should be able to be used for a long time, while conforming to the CLASS A requirement of CIE standard, as well as the requirement for power saving of equipment. For this purpose, further research and upgrading are carried out based on original equipment to further satisfy market requirements.

SUMMARY

In view of the defects in the prior art, the objective of the disclosure is to provide a color matching observation box for an LED standard light source, which can satisfy the CLASS A requirement of CIE standard daylight D65 sources for a long time, and can save more power, compared with previous products.

To fulfill the above objective, the disclosure provides the following technical solution: a color matching observation box for an LED standard light source comprises a box body, wherein an opening is formed in one side of the box body, an observation chamber is formed by the internal space of the box body, and a standard light source is disposed at the top of the observation chamber and comprises multiple lamp beads.

Each of the lamp beads comprises a purple LED chip, a blue LED chip and hybrid fluorescent powder, wherein the purple LED chip has a wavelength of 410 nm-430 nm, the blue LED chip has a wavelength of 440 nm-460 nm, and the hybrid fluorescent powder comprises blue fluorescent powder, yellow fluorescent powder, green fluorescent powder, red fluorescent powder and near-infrared fluorescent powder To sum up, the disclosure has the following beneficial effects.

1. D65 daylight satisfying the CLASS A requirement of CIE standard daylight D65 can be simulated by means of one type of LEDs.

2. Compared with traditional halogen tungsten lamps for simulating D65 light sources, the color matching observation box provided by the disclosure has a remarkable advantage in power saving.

3. Compared with traditional halogen tungsten lamps for simulating D65 light sources, the color matching observation box provided by the disclosure has a remarkable advantage in service life.

4. The color matching observation box in the disclosure is also provided with LED light sources with a color temperature of 2300 K, which are used together with the lamp beads to simulate any light sources with a color temperature from 2300 K to 6500 K.

5. The color matching observation box provided by the disclosure is also provided with two groups of fluorescent lamps and one group of UV lamps.

Figure 1:
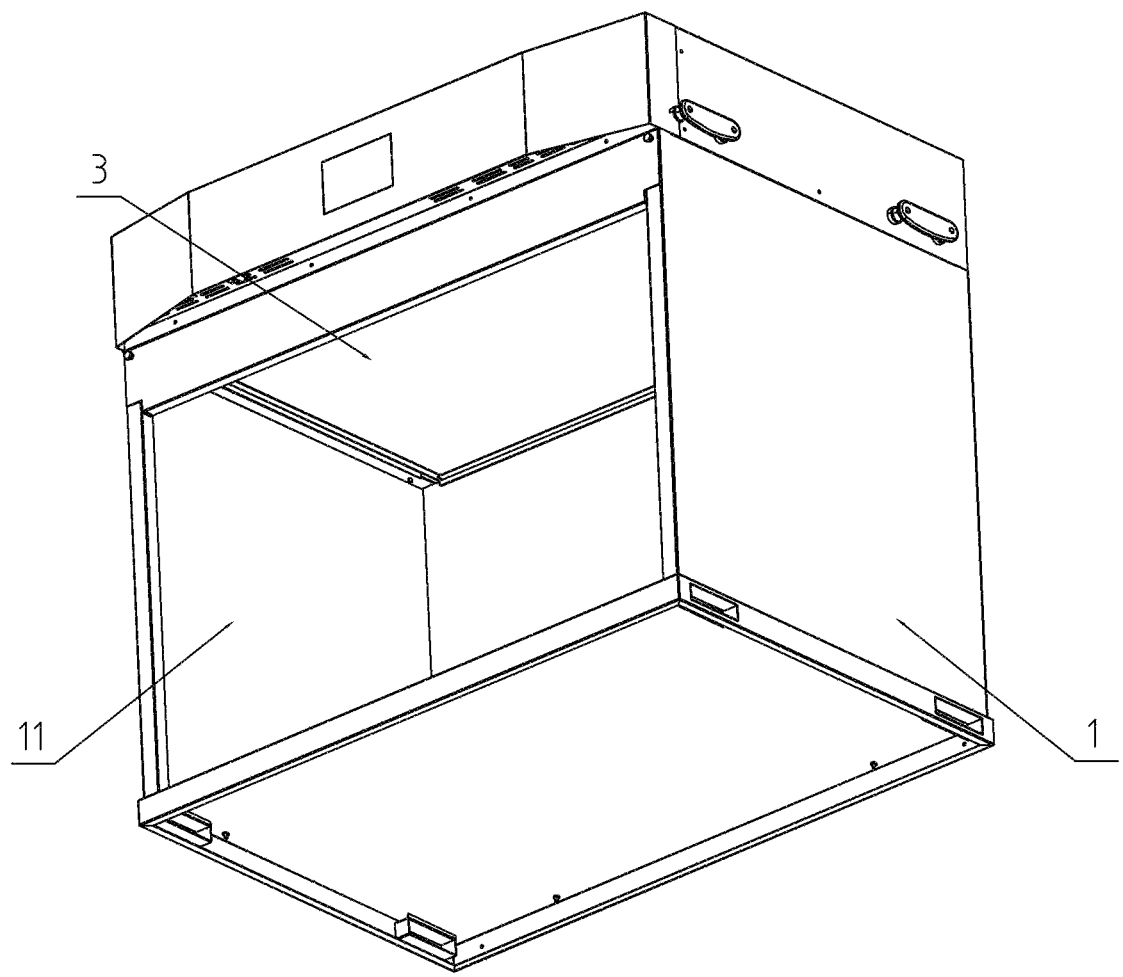
FIG. 1 is a three-dimensional structural view of a box body.

REFERENCE SIGNS 1, box body; 11, observation chamber; 2, standard light source; 21, lamp bead; 22, fluorescent lamp; 23, UV lamp; 24, aluminum substrate; 25, reflecting lampshade; 26, micro-crystal diffusion plate; 27, cooling fin; 3, diffusion glass.

DESCRIPTION OF THE EMBODIMENTS

Hereinafter, the present disclosure will be described in detail with reference to the accompanying drawings and embodiments. In the following description, identical components are represented by identical reference signs. It should be noted that terms used in the following description such as "front", "back", "left", "right", "upper" and "lower" are used to indicate directions based on the accompanying drawings, and terms "bottom surface", "top surface", "inner" and "outer" respectively indicate directions towards or away from the geometric center of a specific component.

Referring to FIG. 1 to FIG. 5, to fulfill the above objective, the disclosure provides the following technical solution: a color matching observation box for an LED standard light source 2 comprises a box body 1, wherein an opening is formed in one side of the box body 1, an observation chamber 11 is formed by the internal space of the box body 1, and a standard light source is disposed at the top of the observation chamber 11 and comprises multiple lamp beads 21.

Each of the lamp beads 21 comprises a purple LED chip, a blue LED chip and hybrid fluorescent powder, wherein the purple LED chip has a wavelength of 410 nm-430 nm, and the blue LED chip has a wavelength of 440 nm-460 nm.

The hybrid fluorescent powder comprises blue fluorescent powder, yellow fluorescent powder, green fluorescent powder, red fluorescent powder and near-infrared fluorescent powder. The color rendering index of the lamp beads 21 is greater than or equal to 97, and the color temperature of the lamp beads 21 is 6500 K.

The standard light source also comprises lamp beads 21 with a color rendering index greater than or equal to 97 and a color temperature of 2300 K.

In the disclosure, the lamp beads 21 with the color temperature of 6500 K are of a double-core structure, and the purple LED chips with the wavelength of 410 nm-430 nm and the blue LED chips with the wavelength of 440 nm-460 nm are combined to stimulate the hybrid fluorescent powder comprising blue fluorescent powder, yellow fluorescent powder, green fluorescent powder, red fluorescent powder and near-infrared fluorescent powder to generate initial white light.

The two types of LED lamp beads 21 with a high color rendering index greater than or equal to 97 and a color rendering index of 2300 K and 6500 K are regularly distributed on LED aluminum substrates 24, such that lights emitted by adjacent LED lamp beads 21 can be fully mixed.

The two types of LED lamp beads adopt different drivers, so the power of any type of LED lamp beads can be separately regulated from 0% to 100%. Lights with different color temperatures can be produced by using the two types of the LED lamp beads in different proportions to simulate a target light source.

Figure 3:
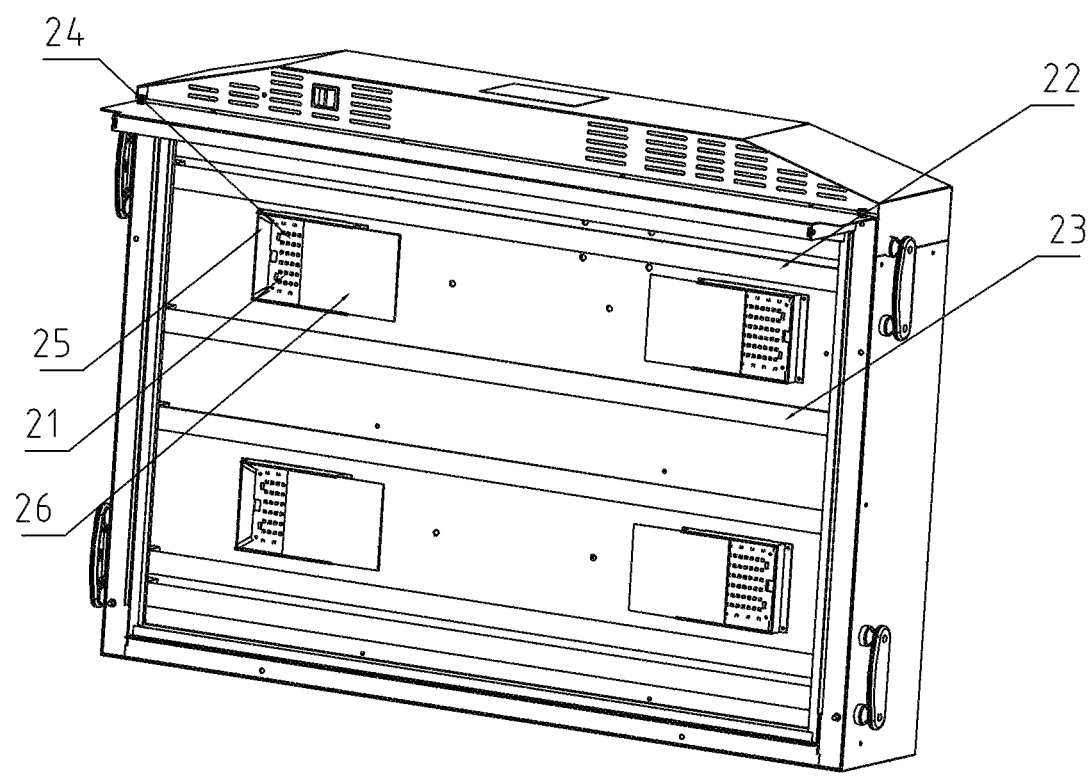
FIG. 3 is a structural view of a light surface of a standard light source.
Figure 4:
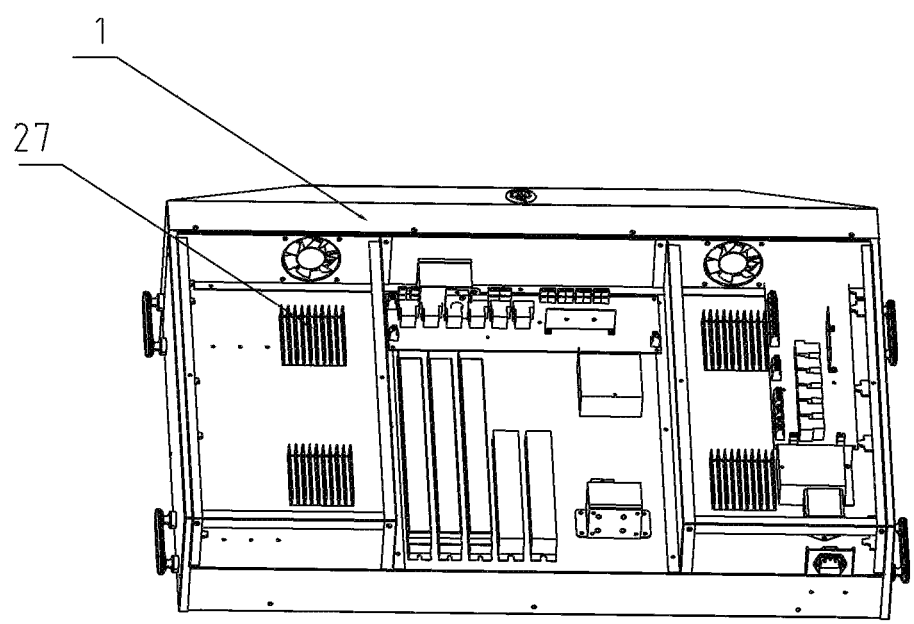
FIG. 4 is a structural view of an assembly surface of the standard light source.
Figure 5:
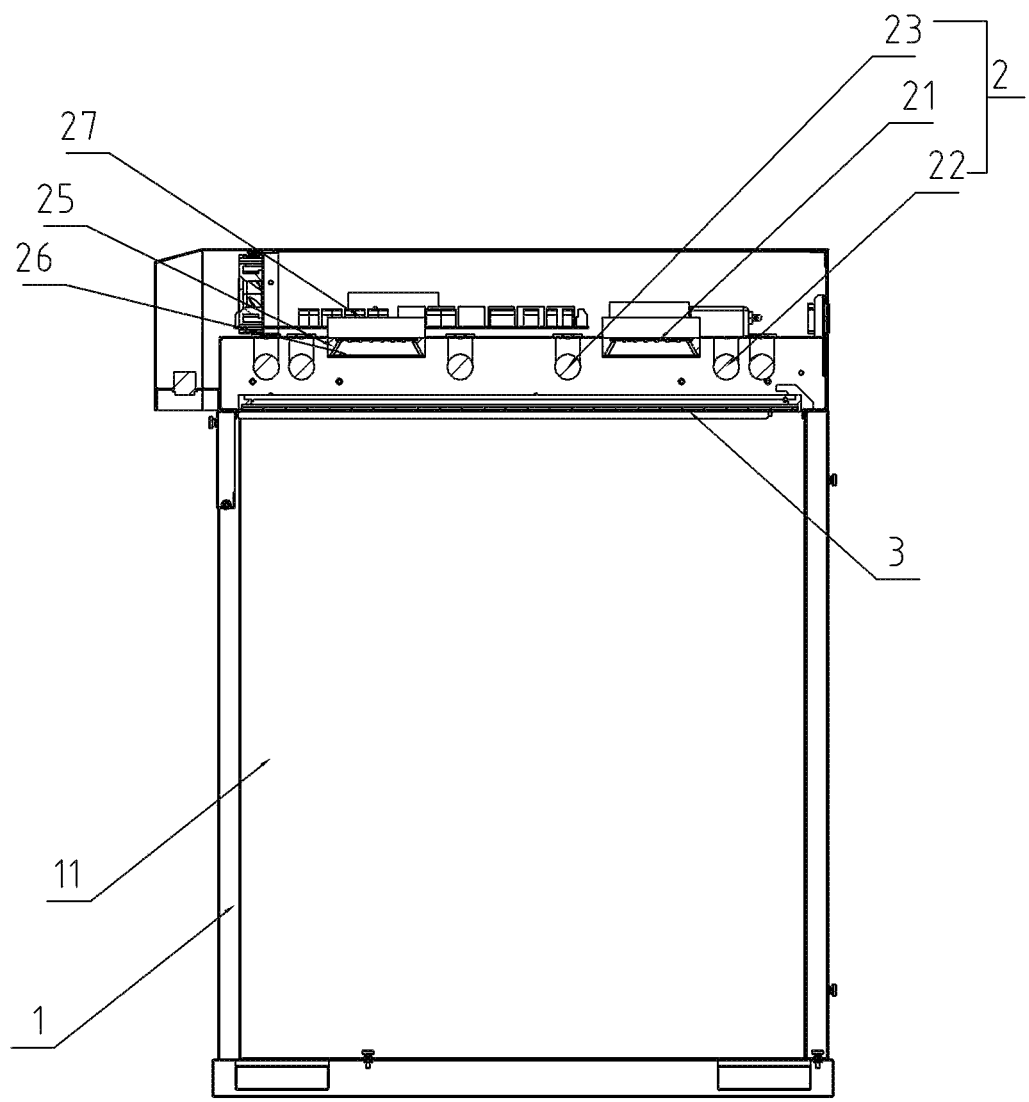
FIG. 5 is a sectional structural view of the box body.

As shown in FIG. 3, the standard light source further comprises, but is not limited to, two groups of CWF (cool white fluorescent), TL83 (European standard warm white fluorescent light), TL84 (European, Japanese, Chinese store light source), U30 (American warm white fluorescent light) and/or U35 (Target specifies light source) fluorescent lamps and one group of UV lamps, wherein the two groups of fluorescent lamps and the one group of UV lamps are disposed on two sides of the lamp beads respectively.

The UV lamps may be used separately or in combination with other light sources to compensate for UV energy.

The color matching observation box further comprises aluminum substrates 24 and a reflecting lampshade 25, wherein the multiple lamp beads 21 are arranged on the aluminum substrates 24, the aluminum substrates 24 are mounted on the reflecting lampshade 25, the reflecting lampshade 25 is fixed on one side of the aluminum substrates 24 and is provided with a diffusion port with an angle, and a reflecting side of the reflecting lampshade 25 is provided with a mirror aluminum plate or is sprayed with white plastic powder to improve the luminous efficiency. A micro-crystal diffusion plate 26 made from PMMA (poly (methyl methacrylate)) is mounted at a light outlet of the reflecting lampshade 25, such that lights emitted by the LED lamp beads 21 can be preliminarily mixed, thus reducing dazzle light. Cooling fins 27 are disposed on the other side of the reflecting lampshade 25.

The cooling fins of the reflecting lampshade 25 partially extend above a stand of the box body. Two cooling fans are mounted above the stand of the box body to allow heat of the aluminum cooling fins 27 to be dissipated out of the box body quickly, such that the temperature stability of the LED lamp beads 21 is guaranteed, making the spectrum curve, color temperature, illuminance and other parameters of lights emitted by the LED lamp beads stable.

An even number of aluminum substrates 24 and the reflecting lampshade 25 are mounted on the stand of the box body 1;

The reflecting side of the reflecting lampshade 25 is provided with a mirror aluminum plate or sprayed with white plastic powder.

For example, two or four LED aluminum substrates 24 are mounted on the reflecting lampshade 25 provided with one mirror aluminum plate, together with heat sinks, or are mounted on the reflecting lampshade 25 sprayed with white plastic powder, so the reflectivity within the visible light range of 400 nm-700 nm is higher than or equal to 85%, thus improving the illuminance of a target illuminated surface.

Diffusion glass 3 is disposed at a light outlet of the box body 1, and is located below the aluminum substrates 24.

The distance between the diffusion glass 3 and the aluminum substrates 24 is 20 mm-40 mm.

The distance between the diffusion glass 3 and the aluminum substrates 24 is 30 mm.

The finally obtained white light has a color temperature of 6500±200K, a color rendering index Ra greater than or equal to 97 (R1-R15≥90), a metamerism index $MI_{VIS}$ within the visible light band less than 0.25, thus satisfying the CLASS A requirement of a CIE standard daylight D65 source from CIE 1931 XYZ color space; and the diffusion glass 3 can hide the LED lamp beads 21, such that dazzle light generated by the LED lamp beads is reduced, the light loss is reduced, and the overall luminous efficacy is improved.

The light quality of the LED lamp beads can satisfy the requirement of CIE standard D illuminants for a CLASS A metamerism index within the visible light band, that is, $MI_{VIS}$ is less than 0.25; the color rendering index Ra is greater than or equal to 97, R1-R15≥90; and the color temperature is 6500K±200K.

Figure 2:
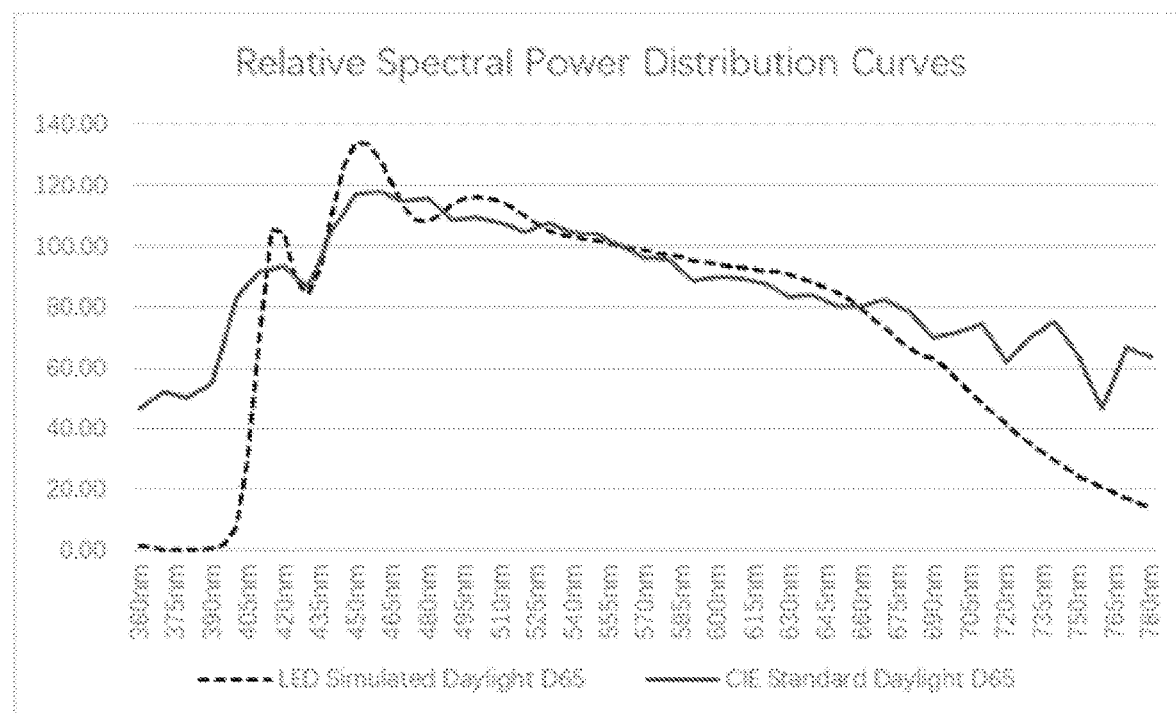
FIG. 2 is a comparison diagram of the spectral power distribution curve of standard D65 and the spectral power distribution curve of simulated daylight 65 according to the disclosure.

By testing, the color temperature of the daylight D65 source simulated by the LED lamp beads is 6495 K, the illuminance can be adjusted from 500 lux to 3000 lux, the color rendering index is 98, and $MI_{VIS}$ is 0.15. FIG. 2 illustrates relative spectral distribution curves of the simulated daylight D65 and standard daylight D65, wherein the dotted line represents the simulated daylight D65, and the solid line represents the standard daylight D65.

To sum up, the disclosure has the following advantages:

1. D65 daylight satisfying the CLASS A requirement of CIE standard daylight D65 can be simulated by means of one type of LEDs.

2. Compared with traditional halogen tungsten lamps for simulating D65 light sources, the color matching observation box provided by the disclosure has a remarkable advantage in power saving, and power consumed by the color matching observation box is merely about 5% that of traditional halogen tungsten lamps.

3. Compared with traditional halogen tungsten lamps for simulating D65 light sources, the color matching observation box provided by the disclosure has a remarkable advantage in service life, and the service life of the color matching observation box can reach 8,000 hours, which is much longer than the service life (400 hours or 600 hours) of traditional halogen tungsten lamps.

4. The color matching observation box in the disclosure is also provided with LED light sources with a color temperature of 2300 K, which are used together with the lamp beads to simulate any light sources with a color temperature from 2300 K to 6500 K.

5. The color matching observation box provided by the disclosure is also provided with two groups of fluorescent lamps and one group of UV lamps.

The above embodiments are merely preferred ones of the disclosure, the protection scope of the disclosure is not limited to the above embodiments, and all technical solutions obtained based on the concept of the disclosure should fall within the protection scope of the disclosure. It should be pointed out that those ordinarily skilled in the art can make some improvements and modifications without deviating from the principle of the disclosure, and all these improvements and modifications should also fall within the protection scope of the disclosure.

What is claimed is:

1. A color matching observation box for an LED standard light source, comprising a box body, an opening being formed in a side of the box body, an observation chamber being formed by an internal space of the box body, and a standard light source being disposed at a top of the observation chamber, wherein the standard light source comprises multiple LED lamp beads;
    each of the multiple LED lamp beads comprises a purple LED chip, a blue LED chip and hybrid fluorescent powder, the purple LED chip has a wavelength of 410 nm-430 nm, and the blue LED chip has a wavelength of 440 nm-460 nm;
    the hybrid fluorescent powder comprises blue fluorescent powder, yellow fluorescent powder, green fluorescent powder, red fluorescent powder and near-infrared fluorescent powder.

2. The color matching observation box for the LED standard light source according to claim 1, wherein the standard light source further comprises two groups of CWF (cool white fluorescent), TL84 (European, Japanese, Chinese store light source), TL83 (European standard warm white fluorescent light), U30 (American warm white fluorescent light) or U35 (Target specifies light source) fluorescent lamps.

3. The color matching observation box for the LED standard light source according to claim 1, wherein the standard light source further comprises UV lamps.

4. The color matching observation box for the LED standard light source according to claim 1, wherein the color matching observation box comprises an aluminum substrate and a reflecting lampshade, and the multiple LED lamp beads are arranged on the aluminum substrate.

5. The color matching observation box for the LED standard light source according to claim 4, wherein the color matching observation box comprises an even number of the aluminum substrates, and the aluminum substrates are mounted on the reflecting lampshade;
    the reflecting lampshade is fixed on one side of the aluminum substrates, and is provided with a diffusion port with an angle, and a reflecting side of the reflecting lampshade is provided with a mirror aluminum plate or is sprayed with white plastic powder.

6. The color matching observation box for the LED standard light source according to claim 5, wherein a microcrystal diffusion plate made from PMMA (poly(methyl methacrylate)) is mounted at a light outlet of the reflecting lampshade, and cooling fins are disposed on the other side of the reflecting lampshade;
    a diffusion glass is disposed at a light outlet of the box body.

7. The color matching observation box for the LED standard light source according to claim 6, wherein a distance between the diffusion glass and the aluminum base plates is 20 mm-40 mm.

8. The color matching observation box for the LED standard light source according to claim 7, wherein the distance between the diffusion glass and the aluminum base plates is 30 mm.

9. The color matching observation box for the LED standard light source according to claim 1, wherein the multiple LED lamp beads have a color rendering index greater than or equal to 97, and a color temperature of 2300 K and 6500 K;

a metamerism index $MI_{VIS}$ within a visible light band of the multiple LED lamp beads with the color temperature of 6500 K is less than 0.25, which conforms to Class A specified by the CIE standard from CIE 1931 XYZ color space.

* * * * *